(12) United States Patent
Bouillon et al.

(10) Patent No.: US 10,156,243 B2
(45) Date of Patent: Dec. 18, 2018

(54) COMPOSITE SPLITTER LIP FOR AXIAL TURBOMACHINE COMPRESSOR

(71) Applicant: Techspace Aero S.A., Herstal (Milmort) (BE)

(72) Inventors: David Bouillon, Woluwe-Saint-Lambert (BE); Ghislain Herbaut, Berloz (BE)

(73) Assignee: Safran Aero Boosters SA (BE)

( * ) Notice: Subject to any disclaimer, the term of this patent is extended or adjusted under 35 U.S.C. 154(b) by 378 days.

(21) Appl. No.: 15/141,926

(22) Filed: Apr. 29, 2016

(65) Prior Publication Data

US 2016/0327052 A1 Nov. 10, 2016

(30) Foreign Application Priority Data

May 4, 2015 (BE) .................................. 2015/5282

(51) Int. Cl.
*F02C 7/04* (2006.01)
*F04D 29/02* (2006.01)
*F01D 25/24* (2006.01)
*F02C 7/047* (2006.01)
*F02C 3/04* (2006.01)
(Continued)

(52) U.S. Cl.
CPC ........... *F04D 29/023* (2013.01); *F01D 25/24* (2013.01); *F02C 3/04* (2013.01); *F02C 7/04* (2013.01); *F02C 7/047* (2013.01); *F04D 19/02* (2013.01); *F04D 29/522* (2013.01); *F04D 29/701* (2013.01); *F05D 2220/32* (2013.01);
(Continued)

(58) Field of Classification Search
CPC ........................ F01D 25/24; F02C 7/04–7/057
See application file for complete search history.

(56) References Cited

U.S. PATENT DOCUMENTS 8,448,901 B2 * 5/2013 Porte ...................... B64D 15/04
244/134 B
8,899,917 B2 * 12/2014 Bajusz .................... F01D 25/02
415/144
(Continued)

FOREIGN PATENT DOCUMENTS

EP 1801389 A1 6/2007
EP 2505789 A1 10/2012
(Continued)

OTHER PUBLICATIONS

European Search Report from corresponding Belgium Application No. BE 201505282, dated Jan. 13, 2016.

*Primary Examiner* — Woody A Lee, Jr.
(74) *Attorney, Agent, or Firm* — Sandberg Phoenix & von Gontard P.C.

(57) ABSTRACT

The invention proposes a splitter lip for a low-pressure compressor of an axial turbomachine for an aeroplane. The splitter lip comprises an upstream annular wall made of metal with a circular leading edge, and a downstream annular partition made of an organic-matrix, short-fiber composite material. The splitter lip also supports an outer shroud for a stator upstream of the compressor. The upstream wall comprises an annular anchoring portion arranged in the thickness of the downstream partition so as to anchor the partition and the wall to one another. The anchoring portion has distributed hexagonal openings in order to increase anchoring. The invention also proposes a method for producing, by molding, a bi-material splitter lip or a mixed lip.

20 Claims, 2 Drawing Sheets

(51) Int. Cl.
*F04D 19/02* (2006.01)
*F04D 29/52* (2006.01)
*F04D 29/70* (2006.01)

(52) U.S. Cl.
CPC .... *F05D 2230/60* (2013.01); *F05D 2300/603* (2013.01); *Y02T 50/672* (2013.01)

(56) References Cited

U.S. PATENT DOCUMENTS

| | | | |
|---|---|---|---|
| 9,777,632 B2* | 10/2017 | Prather | F02C 7/047 |
| 2004/0065092 A1* | 4/2004 | Wadia | F01D 25/02 |
| | | | 60/778 |
| 2010/0236213 A1* | 9/2010 | Schilling | F01D 25/14 |
| | | | 60/39.08 |
| 2012/0192544 A1* | 8/2012 | Roby | F01D 25/02 |
| | | | 60/226.1 |
| 2013/0202425 A1* | 8/2013 | Balk | F01D 9/041 |
| | | | 415/200 |
| 2014/0322482 A1* | 10/2014 | Sinha | B29C 70/72 |
| | | | 428/102 |

FOREIGN PATENT DOCUMENTS

| | | | |
|---|---|---|---|
| FR | 2989734 | A1 | 10/2013 |
| FR | 3005693 | A1 | 11/2014 |

\* cited by examiner

COMPOSITE SPLITTER LIP FOR AXIAL TURBOMACHINE COMPRESSOR

CROSS-REFERENCE TO RELATED APPLICATIONS

This application claims the benefit, under 35 U.S.C. § 119, of BE 2015/5282 filed May 4, 2015, the disclosure of which is incorporated herein by reference in its entirety.

FIELD

The invention relates to an air inlet for an axial turbomachine. More particularly, the invention relates to a splitter lip for an axial turbomachine. The invention also relates to a method for producing a splitter lip for an axial turbomachine.

BACKGROUND

Turbofan engines have been developed to care for the environment. Care for the environment is in this case intended to mean limiting noise and reducing consumption. With a view to optimizing thrust and performance while reducing noise, jet engines use multiple annular air flows, for example two or three.

Generally, a turbomachine splits an incoming air flow into a primary flow and a secondary flow in the form of annular sleeves. The primary flow passes through the compressors, a combustion chamber and is then expanded in turbines. The secondary flow passes around the outside of the compressor, the combustion chamber and the turbine, and then re-joins the primary flow at the exit from the jet engine. The flows are split by a circular splitter lip placed upstream of the compressor. The shape of this lip limits the amount of air entering the compressor.

A splitter lip needs to be robust as it is exposed to ingestion of foreign bodies during operation. It must therefore also make it possible to support various elements such as an upstream stator of a compressor, and/or an acoustic panel. It can also house a de-icing system, the ducts and/or passages of which it has to hold and protect.

EP1801389 A1 discloses a splitter lip for a low-pressure compressor of an axial turbomachine. The lip comprises an annular metal body forming a mechanical link between an inner shroud and an acoustic panel. The splitter lip comprises an axial flange that fits tightly against the inside of the acoustic panel for attachment by means of screws. However, this attachment method is weak due to the addition of screws, which gives rise to stress concentrations.

SUMMARY

The invention has the object of solving at least one of the problems presented by the prior art. More particularly, the invention has the object of strengthening the assembly of a splitter lip. The invention also has the object of reducing the weight of a splitter lip.

It will be well understood that in various embodiments the invention relates to a splitter lip. In various embodiments, the splitter lip can comprise a composite downstream partition, and, in various instances, a metallic upstream partition with a circular leading edge and a projection for attachment in the thickness of the downstream partition. According to various other embodiments, the invention relates to a splitter lip with two partitions which are outside the leading edge and which are made of two different materials, one of them having an anchoring portion that is integrated in the other so as to join them.

In various embodiments, the invention also relates to a splitter lip for a turbomachine, for example, a low-pressure compressor of an axial turbomachine, wherein the lip comprises an upstream annular wall with a circular leading edge, a downstream annular partition, notable in that the upstream wall comprises an annular anchoring portion arranged in the thickness of the downstream partition so as to anchor the partition and the wall to one another.

According to various advantageous embodiments of the invention, the downstream partition comprises an outer annular surface and an inner annular surface, the anchoring portion being at a distance from the outer surface and the inner surface.

According to various advantageous embodiments of the invention, the anchoring portion comprises at least one anchoring roughness, in various instances, multiple anchoring roughnesses distributed over its surface.

According to various advantageous embodiments of the invention, the anchoring portion comprises at least one anchoring opening, in various instances, multiple anchoring openings through which passes the material of the downstream partition, in various instances the openings are hexagonal.

According to various advantageous embodiments of the invention, the anchoring portion comprises a network of interconnected junctions, in various instances, repeating a pattern over the axial majority of the anchoring portion and/or essentially all around the splitter lip.

According to various advantageous embodiments of the invention, the materials of the anchoring portion and of the downstream partition are intermeshed, the material of the downstream partition occupying the majority of the anchoring portion.

According to various advantageous embodiments of the invention, the downstream partition and the upstream wall each comprise outer annular surfaces, wherein the surfaces extend in line with one another and/or are tangential on the circumference.

According to various advantageous embodiments of the invention, the upstream wall comprises a strengthening annular thickened portion, in various instances the leading edge being formed on the annular thickened portion.

According to various advantageous embodiments of the invention, the upstream wall comprises a profile of revolution with a portion delimited by an arc, the anchoring portion extending axially from the arc, the arc and/or the portion, in various instances, extending over the majority of the thickness of the upstream wall.

According to various advantageous embodiments of the invention, the anchoring portion forms a zone of lesser thickness on the upstream wall, in various instances, the anchoring portion is delimited upstream by at least one, for example, by at least two annular steps.

According to various advantageous embodiments of the invention, the splitter lip comprises an outer shroud surrounded by the downstream partition, in various instances the splitter lip comprises an annular row of stator vanes supported by the outer shroud, the anchoring portion being, in various instances, arranged axially at the level of the row of vanes, for example in line with the leading edges of the vanes.

According to various advantageous embodiments of the invention, the upstream wall comprises an annular attachment hook, in various instances, oriented axially in the downstream direction, the outer shroud, in various instances, being attached to the annular hook.

According to various advantageous embodiments of the invention, the downstream partition comprises a composite material with an organic matrix and fibres. In various instances, the downstream partition can be solid.

According to various advantageous embodiments of the invention, the downstream partition comprises an annular flange extending radially inwards.

According to various advantageous embodiments of the invention, the thickness of the downstream partition is generally constant in the axial direction and/or around the circumference of the splitter lip.

According to various advantageous embodiments of the invention, the anchoring portion is arranged equidistant between the outer surface and the inner surface of the downstream partition.

According to various advantageous embodiments of the invention, the anchoring portion fits close to the outer surface and the inner surface of the downstream partition.

According to various advantageous embodiments of the invention, the anchoring portion forms a sheet, for example, a perforated sheet.

According to various advantageous embodiments of the invention, the anchoring portion comprises an inner annular face and an outer annular face, at least one or both of the faces being covered by and/or in contact with the downstream partition.

According to various advantageous embodiments of the invention, the upstream wall is made of metal, in particular titanium or a titanium alloy.

According to various advantageous embodiments of the invention, the annular hook comprises at least one tubular surface and/or forms an annular recess with an axial profile.

According to various advantageous embodiments of the invention, the splitter lip comprises an annular cavity bounded on the outside by the downstream partition, and, in various instances, by the outer shroud on the inside.

According to various advantageous embodiments of the invention, the anchoring portion can be discontinuous around the circumference of the splitter lip.

According to various advantageous embodiments of the invention, the downstream partition is solid.

According to various advantageous embodiments of the invention, the anchoring portion has a curved profile of revolution.

According to various advantageous embodiments of the invention, the upstream wall is a block joining the downstream partition and the outer shroud.

According to various advantageous embodiments of the invention, the anchoring portion is at least generally arranged in the middle of the thickness of the downstream partition.

According to various advantageous embodiments of the invention, the downstream partition and the upstream wall comprise a smooth outer circular join.

According to various advantageous embodiments of the invention, the profile of revolution of the outer surface of the upstream wall and/or of the downstream partition is optionally straight and/or is generally inclined by 5° to 30° with respect to the axis of revolution of the splitter lip.

According to various advantageous embodiments of the invention, the upstream wall and its anchoring portion are in one piece and/or integrally joined.

In various embodiments, the invention relates to a turbomachine comprising a splitter lip, notable in that the splitter lip is in accordance with the invention, in various instances, the turbomachine comprises a compressor with an inlet delimited by the splitter lip.

According to various advantageous embodiments of the invention, the turbomachine comprises a fan, the splitter lip surrounding the fan, in various instances, the upstream wall has a constant thickness and/or is hollow.

According to various advantageous embodiments of the invention, the turbomachine comprises a nacelle, the splitter lip being formed on the nacelle.

In various embodiments, the invention relates to a method for producing a splitter lip for an axial turbomachine, for example, for a compressor, the lip comprises an upstream annular wall with a circular leading edge, and a composite downstream annular partition. In various embodiments, the method comprises (a) providing or producing an upstream annular wall, notable in that the upstream wall comprises an anchoring portion and that the method comprises (b) moulding a downstream partition onto the anchoring portion so as to anchor the upstream wall in the downstream partition via the anchoring portion.

According to various advantageous embodiments of the invention, the moulding step (b) comprises the application of an injection mould against the outer annular surface of the upstream wall.

Generally, the advantageous embodiments of each subject of the invention can equally be applied to the other subjects of the invention. Insofar as is possible, each subject of the invention can be combined with other subjects.

The splitter lip favours the creation of a bi-material splitter lip, which allows precise strengthening of the leading edge with the lip then being extended with a composite partition in order to optimize weight saving. Overall, such a turbomachine becomes lighter, which reduces the fuel consumption of the corresponding aircraft. The use of several materials simplifies the creation of certain shapes. Cost-effective materials can be used depending on the loads to which they are subjected.

In various embodiments, the thickness of the anchoring portion can be reduced in order to reduce its rigidity, which limits stress concentrations and avoids the formation of hard points. The creation of a trellis-structured annular zone improves the interface. The downstream partition is connected to the upstream wall with the aid of a zone extending axially, wherein attachment is improved.

The invention reduces the number of interfaces between the various elements, which simplifies assembly and maintenance.

DRAWINGS

DETAILED DESCRIPTION

In the following description, the terms inner or internal and outer or external refer to a position with respect to the axis of rotation of an axial turbomachine. The axial direction corresponds to the direction along the axis of rotation of the turbomachine.

Figure 1:
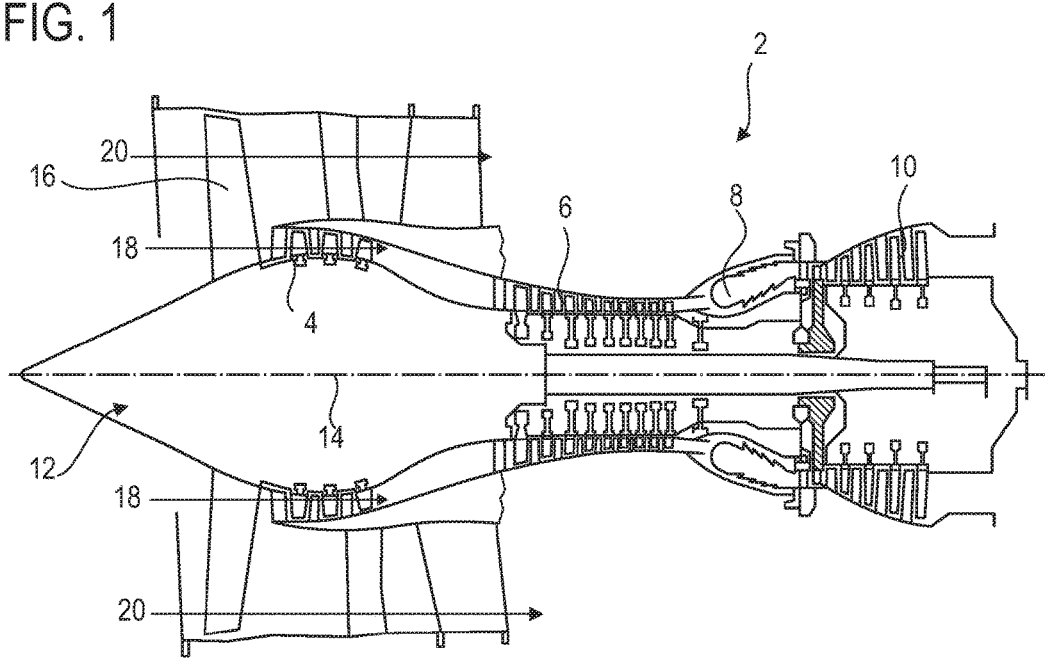
FIG. 1 shows an axial turbomachine according to various embodiments of the invention.

FIG. 1 is a simplified illustration of an axial turbomachine. In this exemplary case, it is a turbofan engine. The engine 2 comprises a first compression stage, called the low-pressure compressor 4, and a second compression stage, called the high-pressure compressor 6, a combustion chamber 8 and one or more turbine stages 10. In operation, the mechanical power of the turbine 10 transmitted via the central shaft to the rotor 12 drives the two compressors 4 and 6. These comprise multiple rows of rotor blades associated with rows of stator vanes. The rotation of the rotor about its axis of rotation 14 thus makes it possible to generate a flow of air and to progressively compress the latter up to the inlet into the combustion chamber 8. Gearing means can increase the speed of rotation transmitted to the compressors.

An inlet fan 16 is coupled to the rotor 12 and generates a flow of air which is split into a primary flow 18 passing through the various above-mentioned stages of the turbomachine and a secondary flow 20 passing through an annular duct (shown in part) along the machine in order to then re-join the primary flow 18 at the exit from the turbine. The secondary flow 20 can be accelerated so as to generate a thrust reaction. The primary 18 and secondary 20 flows are annular flows, that is, they are ducted by the casing of the turbomachine. To that end, the casing has cylindrical walls or shrouds which can be internal and external.

Figure 2:
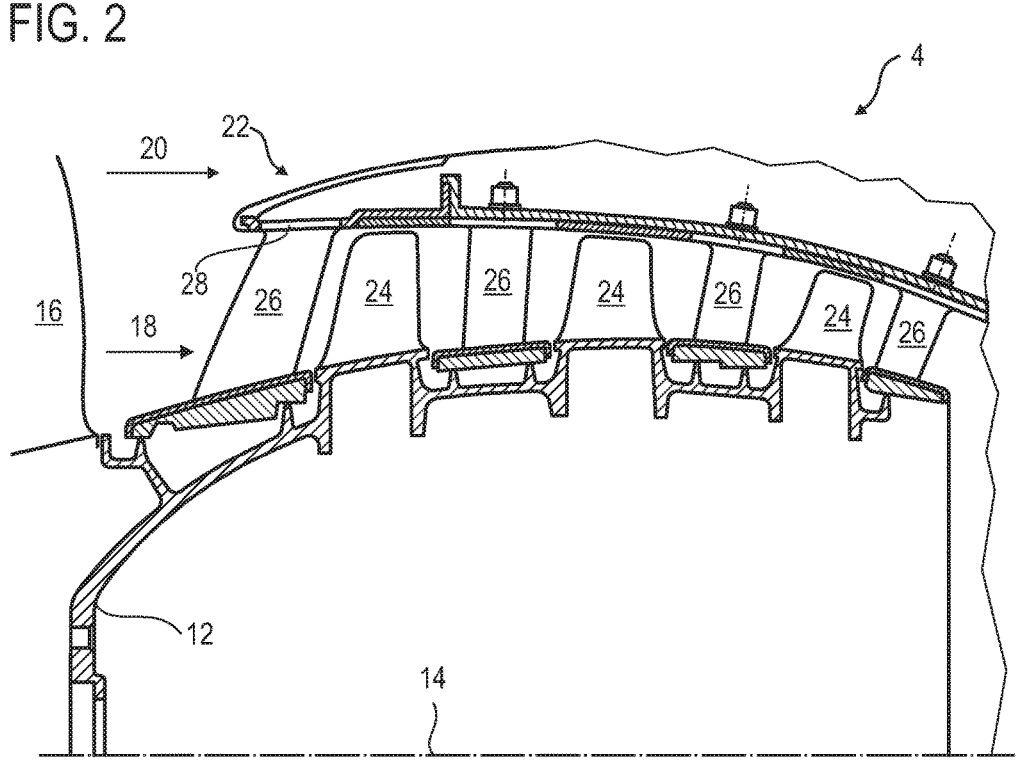
FIG. 2 is a diagram of a turbomachine compressor according to various embodiments of the invention.

FIG. 2 is a view in section of a compressor of an axial turbomachine such as that of FIG. 1. The compressor can be the low-pressure compressor 4. FIG. 2 shows a part of the fan 16 and the lip 22 for splitting the primary flow 18 and the secondary flow 20. The rotor 12 comprises multiple, for example, three, rows of rotor blades 24.

The low-pressure compressor 4 comprises multiple, for example, four, stators which each contain a row of stator vanes 26. The stators are associated with the fan 16 or with a row of rotor blades 24 in order to redirect the flow of air such that the speed of the flow is converted into static pressure. The stator vanes 26 extend essentially radially inwards from their support. They have cambered profiles which are pivoted in order to redirect axially an annular flow with a circumferential component.

Three stators are integrated in the outer casing of the compressor, the corresponding vanes can be attached thereto by means of spindles. An upstream stator, at the inlet to the compressor, can comprise vanes 26 welded to an outer shroud 28. This outer shroud 28 can be borne upstream by the splitter lip 22.

Figure 3:
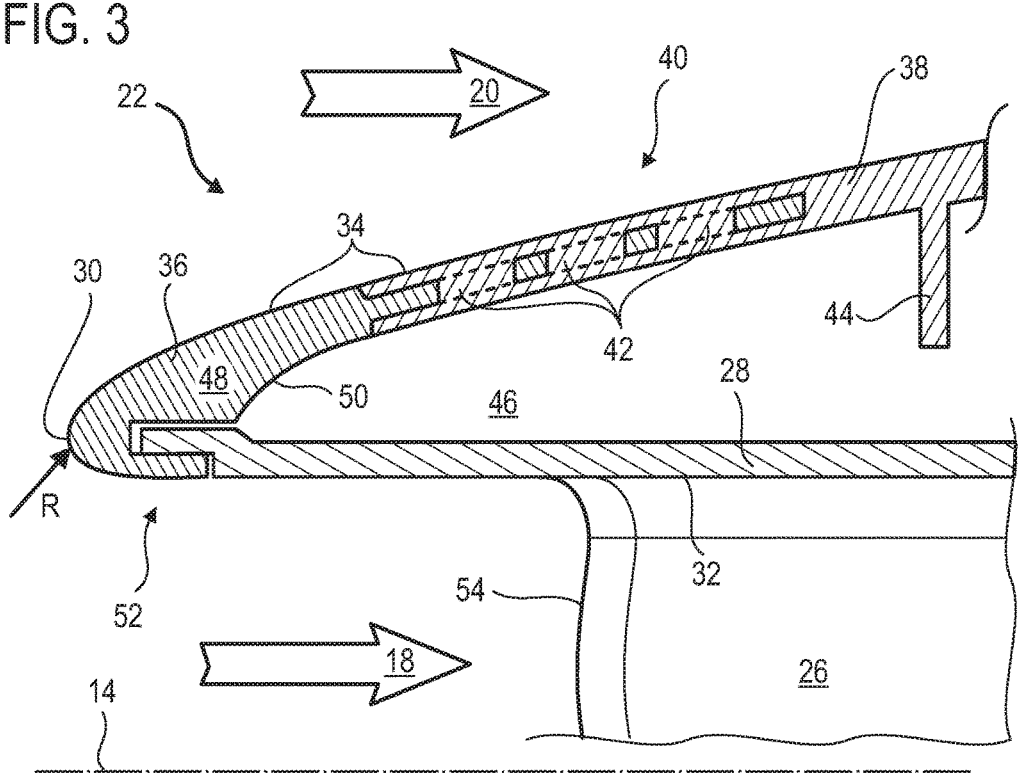
FIG. 3 shows a section through a splitter lip according to various embodiments of the invention.

FIG. 3 shows a section through the splitter lip 22 in a plane passing through the axis of rotation 14. FIG. 3 shows the outer end of a stator vane 26.

The splitter lip 22 comprises, upstream, a circular leading edge 30 where the primary flow 18 and the secondary flow 20 split. The splitter lip 22 has an inner surface 32, essentially formed on the outer shroud 28, and an outer surface 34. These surfaces are annular and meet at the leading edge 30. The profiles of revolution of the inner surface 32 and of the outer surface 34 can be generally straight, they can be inclined with respect to one another by 5° to 60°, for example, by 10° to 40°, e.g., by 20° to 30°. The profiles of revolution are around an axis of revolution 14 which coincides with the axis of rotation 14 of the turbomachine.

The splitter lip 22 comprises, in the direction of flow, an upstream annular wall 36, then a downstream annular partition 38. The downstream annular partition 38 can be a bulkhead and/or a shell. The upstream wall 36 and the downstream partition 38 extend outwards and downstream from the leading edge 30 and form the outer surface 34 of the lip 22. The upstream wall 36 can also extend inwards.

The upstream wall 36 and the downstream partition 38 can have a smooth join, that is, their outer surfaces 34 prolong one another and are tangential.

The upstream wall 36 can be made of metal, for example titanium. This material provides strength which is necessary for the leading edge in the event of an impact, for example ingestion of foreign bodies. Metal also provides thermal conduction which is beneficial for de-icing. In order to then reduce the overall mass of the splitter lip 22, the downstream partition 38 can be made of a composite material. This material can comprise an organic matrix and fibres. The matrix can be polyetherimide (PEI), polyether ether ketone (PEEK) or an equivalent material. The fibres can be carbon fibres and/or graphite fibres and/or glass fibres and/or any other equivalent fibres. The fibres can be short fibres, that is to say of length less than 5.00 mm, for example, less than 2.00 mm. Such a composite offers a compromise between weight gain and rigidity while offering the possibility of reducing the thickness of the downstream partition 38.

In order to improve their joining conditions, the upstream wall 36 comprises, in various instances, an annular anchoring portion 40. This portion 40 is arranged in the thickness of the downstream partition 38, for example centrally, that is to say at the middle of its thickness. The anchoring portion 40 has at least one face, for example, two faces, to which the material of the partition 38 adheres. In order to improve retention, the faces can have roughnesses such as bumps or bulges.

The anchoring portion 40 can comprise at least one through opening 42, in various instances, multiple through openings 42, which can form roughnesses. These openings 42 make it possible to connect the upstream wall 36 and the downstream partition 38 by intermeshing the materials thereof. The material of the downstream partition 38 penetrates and passes through the openings 42 in order to anchor itself therein. The axial region in which the anchoring portion 40 is located makes it possible to strengthen the downstream partition 38. This can become composite, in various instances, double-reinforced by virtue of the anchoring portion and its possible fibres. The anchoring portion 40 can form a reinforcing lattice, for example, bounded by solid strips.

The downstream partition 38 can comprise an annular attachment flange 44 which extends radially and which can form a separation in order to delimit a plenum for a de-icing system (not shown). It can moreover support conduits thereof for conveying hot fluid. It can have a row of attachment openings (not shown) for receiving a flange of an element arranged downstream. The splitter lip 22 can comprise an annular cavity 46, for example for housing components of the turbomachine. This cavity 46 can be formed by the upstream wall 36, the downstream wall 38 and the outer shroud 28. It can be closed downstream by the above-mentioned annular flanges 44.

The upstream wall 36 can comprise an annular thickened portion 48 by means of which it can be strengthened, in particular with respect to ingestion of foreign bodies and in order to better support the outer shroud. The leading edge 30 can be formed on the annular thickened portion 48. At the thickened portion 48, the profile of revolution of the lip 22 has an arc 50 on one side. This arc 50 can extend over the majority of the thickness of the upstream wall 36, wherein the thickness can be measured perpendicular to the outer surface 34 of the upstream wall 36. The arc 50 can bound the anchoring portion 40 so as to reduce the axial length of the upstream wall 36.

The upstream wall 36 can comprise an annular attachment hook 52 that forms an open channel. This attachment means can be used to hold the outer shroud 28 there, which is cantilevered there. The hook 52 can comprise tubular attachment surfaces in order to allow axial mounting of the shroud 28 in the upstream wall 36. The hook 52 can be configured with passages for circulation of hot air for de-icing.

The anchoring portion 40 can be positioned at the level of the vanes 26 supported by the outer shroud. For example, the leading edges 54 of the vanes 26 can extend radially into the anchoring portion 40. This tends to reduce the massive portion of the upstream wall 36, and thus to lighten the lip 22.

At the leading edge 30, the radius R of the profile of revolution of the upstream wall is less than 100 mm, for example, less than 30 mm, e.g., less than or equal to 5.00 mm. The thickness of the downstream partition 38 is less than 20 mm, for example, less than 10 mm, e.g., less than or equal to 5.00 mm.

The splitter lip 22 corresponds to a compressor intake. According to the invention, the splitter lip 22 can also be suitable for a fan intake on a nacelle of the turbomachine, in order to form a splitter lip.

Figure 4:
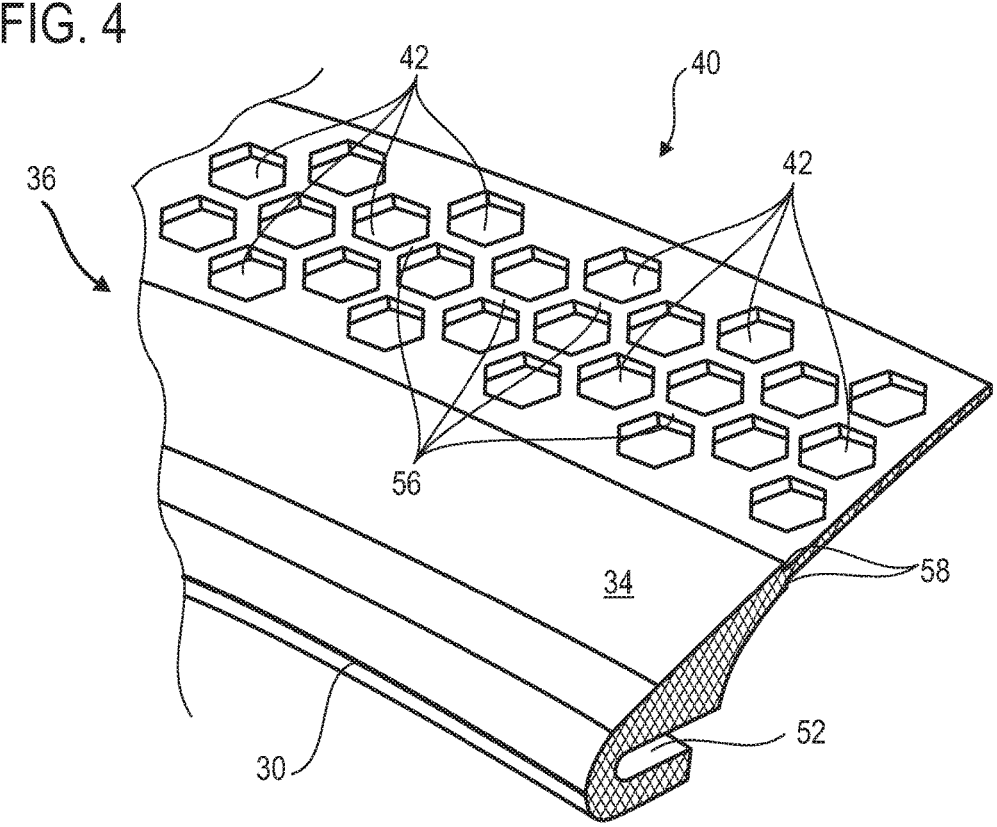
FIG. 4 illustrates the upstream wall and its anchoring portion according to various embodiments of the invention.

FIG. 4 shows an angular segment of the upstream wall 36 and its anchoring portion 40 which are shown in isometric view. The downstream partition is not shown for the sake of clarity. The hook 52 is shown.

The anchoring portion 40 is in the form of a leaf or a sheet. It is essentially thin, with constant thickness. It extends generally along a plane extending the outer surface 34 of the upstream wall 36, or in the continuation of the overall curvature of the outer surface 34.

It can be perforated in the manner of a perforated sheet. The openings 42 of the anchoring portion 40 can be distributed over its entire extent, for example axially and/or circumferentially. They can describe a grid or a repeating pattern. They can be aligned. The openings 42 can be polygons, for example triangles or hexagons, as shown. The openings 42 can be separated by stems 56 forming junctions 56. The openings 42 can be interlinked so as to form a lattice on an axial region of the anchoring portion 40, such that it can be made more flexible. The anchoring portion 40 can be pierced or cut out over 25% of its surface area, or be majority perforated. That is to say that the majority of its extent is devoid of material.

The anchoring portion 40 can form a zone of reduced thickness on the upstream wall 36. It can be delimited axially upstream by two annular steps 58 which can form circular shoulders.

Given the bi-material configuration of the splitter lip 22, in particular of its outer skin, it can be produced using a noteworthy method. The method for producing the lip can comprise the following sequence of steps:

(a) providing or producing an upstream annular wall with a circular leading edge. The upstream wall can be produced by machining, such as turning a curved semi-finished element.

(b) moulding a downstream partition onto the anchoring portion. Thus, the upstream wall is anchored and sealed to the downstream partition via the anchoring portion. The moulding step (b) can involve the application of an injection mould against the outer annular surface of the upstream wall. Another mould can be applied to the inside, and can make it possible to form the internal flange of the partition. Closing the mould defines a moulding cavity. This houses the anchoring portion while waiting for the resin.

What is claimed is:

1. A splitter lip for a turbomachine, the splitter lip comprising:
   an upstream annular wall with a circular leading edge;
   a downstream annular partition,
   wherein the upstream wall comprises an annular anchoring portion arranged in the thickness of the downstream partition so as to anchor the partition and the wall to one another, wherein the downstream partition comprises an outer annular surface and an inner annular surface, the anchoring portion being at a distance from the outer annular surface and the inner annular surface, and wherein materials of the anchoring portion and of the downstream partition are intermeshed, the material of the downstream partition occupying the majority of an apparent volume defined the anchoring portion, the apparent volume being the true volume of the anchoring portion plus the volume of openings formed therein.

2. The splitter lip in accordance with claim 1, wherein the anchoring portion comprises a grid with hexagons or triangles.

3. The splitter lip in accordance with claim 1, wherein the anchoring portion comprises multiple anchoring roughnesses distributed over a surface thereof.

4. The splitter lip in accordance with claim 1, wherein the anchoring portion comprises multiple anchoring openings through which passes the material of the downstream partition.

5. The splitter lip in accordance with claim 1, wherein the anchoring portion comprises a network of interconnected junctions repeating a pattern substantially all around the splitter lip.

6. The splitter lip in accordance with claim 1, wherein the downstream partition comprises an annular shell forming an outer annular surface.

7. The splitter lip in accordance with claim 1, wherein the downstream partition and the upstream wall each comprise outer annular surfaces, the outer annular surfaces being tangential on the circumference of the splitter lip.

8. The splitter lip in accordance with claim 1, wherein the upstream wall comprises a strengthening annular thickened portion, the leading edge being formed on the annular thickened portion.

9. The splitter lip in accordance with claim 1, wherein the upstream wall comprises a profile of revolution with a portion delimited by an arc, the anchoring portion extending axially from the arc, the arc and the anchoring portion extending over the majority of the thickness of the upstream wall.

10. The splitter lip in accordance with claim 1, wherein the anchoring portion forms a zone of lesser thickness on the upstream wall.

11. The splitter lip in accordance with claim 1, wherein the anchoring portion is delimited upstream by at least one annular step.

12. The splitter lip in accordance with claim 1 further comprising an outer shroud surrounded by the downstream partition.

13. The splitter lip in accordance with claim 12, wherein the splitter lip comprises an annular row of stator vanes supported by the outer shroud.

14. The splitter lip in accordance with claim 1, wherein the upstream wall comprises an annular attachment hook oriented axially in the downstream direction.

15. The splitter lip in accordance with claim 1, wherein the material of the downstream partition comprises a composite material with an organic matrix and fibres, the downstream partition being solid.

16. A turbomachine comprising a splitter lip, wherein the splitter lip comprises:
   a composite downstream partition, and
   an upstream annular wall comprising:
      a circular leading edge; and
      a projection for attachment in the thickness of the downstream partition,
   wherein the upstream annular wall being made of another material than the composite downstream partition,
   wherein materials of the projection and of the downstream composite partition are intermeshed, the composite material of the downstream partition occupies the majority of the extent of the projection, the majority of the extent of the projection being devoid of material before the projection is anchored into the composite downstream partition.

17. The turbomachine in accordance with claim 16 further comprising a compressor with an inlet delimited by the splitter lip.

18. The turbomachine in accordance with claim 16 further comprising a fan, the splitter lip surrounding the fan.

19. A method for producing a splitter lip for an axial turbomachine, wherein the splitter lip comprises an upstream annular wall with a circular leading edge and a composite downstream annular partition, said method comprising:
   (a) providing the upstream annular wall, wherein the upstream wall comprises an anchoring portion; and
   (b) moulding the downstream partition onto the anchoring portion so as to anchor the upstream wall in the downstream partition via the anchoring portion, wherein the downstream partition comprises an outer annular surface and an inner annular surface, the anchoring portion being at a distance from the outer annular surface and the inner annular surface, and wherein materials of the anchoring portion and of the downstream partition are intermeshed, the material of the downstream partition occupying the majority of an apparent volume defined the anchoring portion, the apparent volume being the true volume of the anchoring portion plus the volume of openings formed therein.

20. The method in accordance with claim 19, wherein moulding a downstream partition onto the anchoring portion includes the application of an injection mould against an outer annular surface of the upstream annular wall.

* * * * *